(12) United States Patent
Melinand et al.

(10) Patent No.: US 6,202,448 B1
(45) Date of Patent: Mar. 20, 2001

(54) MAKING MINERAL FIBERS INCLUDING ADJUSTMENT OF THE POSITION OF A STREAM OF GLASS AND A ROTOR

(75) Inventors: Alain Melinand, Gouvieux; Luc Alliel, St Just en Chaussee, both of (FR)

(73) Assignee: Isover Saint Gobain, Courbevoie (FR)

( * ) Notice: Subject to any disclaimer, the term of this patent is extended or adjusted under 35 U.S.C. 154(b) by 0 days.

(21) Appl. No.: 09/383,077

(22) Filed: Aug. 26, 1999

Related U.S. Application Data

(63) Continuation of application No. 08/767,154, filed on Dec. 16, 1996, now Pat. No. 5,987,927, which is a continuation of application No. 08/231,171, filed on Apr. 22, 1994, now abandoned.

(30) Foreign Application Priority Data

Apr. 29, 1993 (FR) ................................................ 93 05 057

(51) Int. Cl.[7] .................................................... C03B 37/05

(52) U.S. Cl. ............................ 65/377; 865/378; 865/484; 865/485; 865/469

(58) Field of Search ............................. 65/377, 469, 484, 65/485, 520, 29.17, 164, 378

(56) References Cited

U.S. PATENT DOCUMENTS

| | | | |
|---|---|---|---|
| 2,561,843 | * | 7/1951 | Coleman . |
| 3,303,009 | * | 2/1967 | Sagen ..................................... 65/469 |
| 4,238,213 | * | 12/1980 | Pall ........................................ 65/469 |

* cited by examiner

*Primary Examiner*—John Hoffmann
(74) *Attorney, Agent, or Firm*—Oblon, Spivak, McClelland, Maier & Neustadt, P.C.

(57) ABSTRACT

The production of mineral fibers by centrifuging on rollers (3, 4, 5, 6) with horizontal axes from a stream (1) of molten material includes determining the relative position of the stream (1) of molten material in relation to the first roller (3), and controlling this position by use of CCD cameras (8, 11, 40). A camera (11) observes the periphery of a fiber-drawing roller (4).

7 Claims, 3 Drawing Sheets

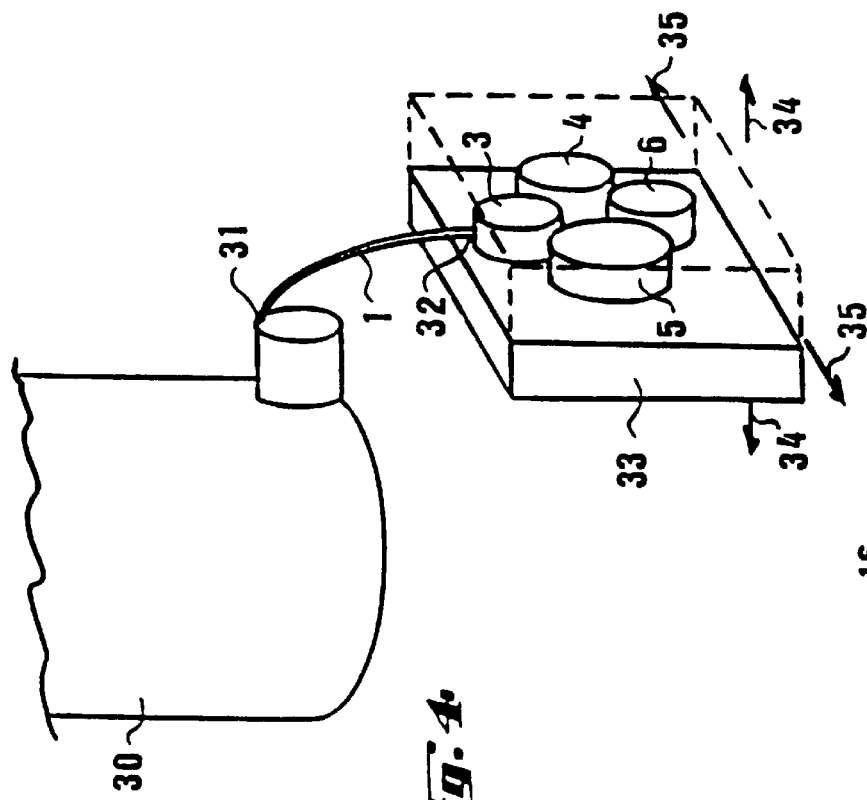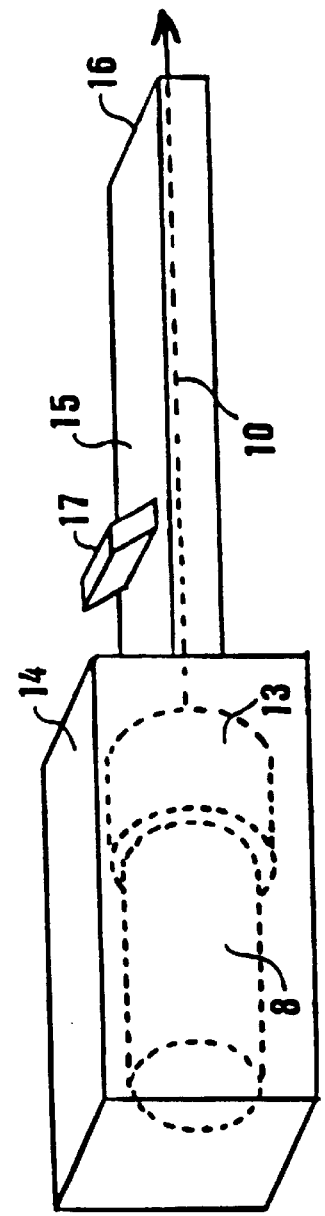

MAKING MINERAL FIBERS INCLUDING ADJUSTMENT OF THE POSITION OF A STREAM OF GLASS AND A ROTOR

CROSS-REFERENCE TO RELATED APPLICATION

This application is a continuation of U.S. patent application Ser. No. 08/767,154 filed on Dec. 16, 1996 now U.S. Pat. No. 5,987,927, which is a continuation of application Ser. No. 08/231,171, filed Apr. 22, 1994, now abandoned.

BACKGROUND OF THE INVENTION

1. Field of the Invention

The invention relates to methods of production of mineral fibers, in which a stream of melted material falls onto the periphery of a rotor which has an approximately horizontal axis and which distributes the melted material to other rotors, the rotors forming the fibers by centrifuging. It relates in particular to the formation of mineral wools based on glass compositions or based on blast furnace slag or basalt, according to the methods described, in particular, in patent applications EP-A-0 167 508 or EP-A-0 059 152.

2. Description of the Related Art

In these methods, it is important to control the position of the point of impact of the stream of melted material on the first roller, and to do this not only in the tangential direction of the rotors where the position affects all the subsequent impacts on the following rotors, but also in the axial direction. Two phenomena depend on this latter position. In a stable process, the temperature of the rotors in the axial direction is not homogeneous since the melted material greatly heats the impact zone whereas the adjacent zones remain colder. It follows that an uncontrolled axial displacement of the zone cools the melted material—on each rotor— and alters the fiber-drawing conditions markedly and rapidly. It therefore is essential that displacements of this type are performed under the control of the operator of the machine.

Furthermore, periodic displacement of the impact zone has a certain advantage since it permits the wear of the surface of the rotor to be distributed over the entire length in the axial direction. It is essential to precisely know the axial position of the melted material for this purpose.

Methods of optical measurement of a stream of molten material which is falling onto a fiber-drawing machine are known. Some of them relate to the determination and the stabilization of the position of a stream of molten material intended to produce fibers by a direct blowing of the melted material. observing the stream in question in the axial direction is possible in the process in question since the stream is sharply deflected and even disappears at the precise instant at which a burner, the axis of which is perpendicular thereto, produces the fibers.

In other methods, the stream of molten material on a fiber-drawing machine is observed by a CCD camera with the object of determining the width of the vertical stream, whereas radiation detectors are used to measure the velocity thereof. These two measures are performed with the object of calculating the flow rate of the material.

The person skilled in the art also knows of the use of CCD cameras to determine the position of objects and even, owing to mechanical, electrical and information systems, to control the relative position or relative displacement thereof. Opto-electronic observation systems have been developed specially for this purpose.

SUMMARY OF THE INVENTION

An object of the invention is to provide a method for determining the relative position of a stream of melted material in relation to a fiber-drawing machine, which is exact and reliable and independent of disturbances in production.

The measuring method and devices according to the invention must also permit the relative position of the stream of melted material in relation to the fiber-drawing machine to be controlled, either to keep it constant, or to modify it in a controlled manner.

The document DD-B-292 439 proposes stabilizing the relative position of a free-falling silicate-based melted stream, and of a fiber-drawing machine comprising, substantially, of a blowing nozzle which acts horizontally, i.e., perpendicular to the original direction of the stream. It follows that, downstream of the nozzle, all the material is entrained horizontally, and that it is thus possible to perform an optical observation, from the bottom to the top, to the end of the stream. The document thus describes a system in which the image of the stream of melted material obtained on a detector connected to the fiber-drawing machine by means of the observation system is kept fixed in relation to the detector by the action of mechanical means which displace the fiber-drawing machine.

The system in DD-B-292 439, comprising the detection of the position of the stream of melted material and the means for stabilizing the relative position thereof in relation to the fiber-drawing machine, is very specific to the fiber-drawing method in question. It cannot be extrapolated to a machine where the material falls successively onto several rotating cylinders, the approximately horizontal axes of which are parallel to one another.

The optical method of evaluating a stream of material during the fall thereof onto a fiber drawing machine, which is essentially intended to measure the flow rate, is described in European patent application EP-A-479 676, for example. A linear camera, known as a CCD (Charged Coupled Device), with a horizontal measuring direction, observes the stream of molten material, and two radiation detectors are placed one above the other and at a distance from one another which is precisely known. The measurements effected are the width of the stream and the time which separates the successive passage of a characteristic feature in front of each of the two detectors. This latter measurement provides the velocity, and the first measurement gives an indication of the section, the two elements combined providing, in turn, an assessment of the flow rate of the material in the stream which is falling.

The present invention proposes a process for obtaining mineral fibers from a thermoplastic material with a high melting point, consisting in the melting of the said material and the distribution thereof, in the melted state and in the form of a stream, onto a rotor of a fiber drawing machine which may comprise several such rotors. The position of the stream in relation to the rotor is determined in a direction approximately perpendicular to the vertical plane containing the stream, and in a horizontal direction approximately parallel to the vertical plane containing the stream, either by determining the position of impact of the stream on the first rotor by means of an optical measurement performed on the stream itself, or by the measurement of the position of the material in the melted state at the periphery of one of the rotors.

Preferably, the position of the stream in a direction that is approximately perpendicular to the vertical plane of the stream is determined by optical observation of the stream itself. On the other hand, the determination of the position of the point of impact of the stream on the first rotor from an optical measurement on the stream itself in a horizontal direction approximately parallel to the vertical plane of the stream is performed by calculation of both the result of the optical measurement and the known position of the starting point of the stream.

When the fiber-drawing machine used in the process according to the invention comprises several rotors and the measurement of the position of the material in the molten state is performed, this is preferably on the first or the second rotor, and thus, advantageously, by optical observation, the optical observations being performed by CCD cameras.

According to the invention, the result of the determination is used to control the position of the point of impact of the stream on the first rotor and the result of the determination of the relative position of the stream in one direction is used to control the relative displacement of the stream and of the fiber-drawing machine approximately in the same direction, and furthermore, the optical observation at the periphery of the rotor is used to determine the width of the melted material there.

The invention likewise relates to a device for obtaining mineral fibers from a melted thermoplastic material comprising a melting furnace, members for distributing a stream of molten material, and rotors intended to distribute the molten material and/or to centrifuge the fibers, which further comprise an optical observing member scanning, approximately, a generated line of one of the rotors, and also an optical observing member scanning an approximately perpendicular straight part, at the same time as the scanning of the stream of melted material and the generated line of the rotor by the first optical observing member.

The optical observing members form part of the CCD cameras, and either the distributing members of the stream of melted material or the fiber-drawing machine are provided with displacement means. In both cases, these means act in directions that are approximately parallel to the scanning directions of the optical observing members. Furthermore, an electric and/or electronic system controls the displacement means as a function of the signals provided by the optical observing members.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 shows the camera protected in its mounting device;

FIG. 4 shows a schematic diagram of the device according to the invention with displacement of the fiber-drawing machine.

DETAILED DESCRIPTION OF THE PREFERRED EMBODIMENTS

Figure 1:
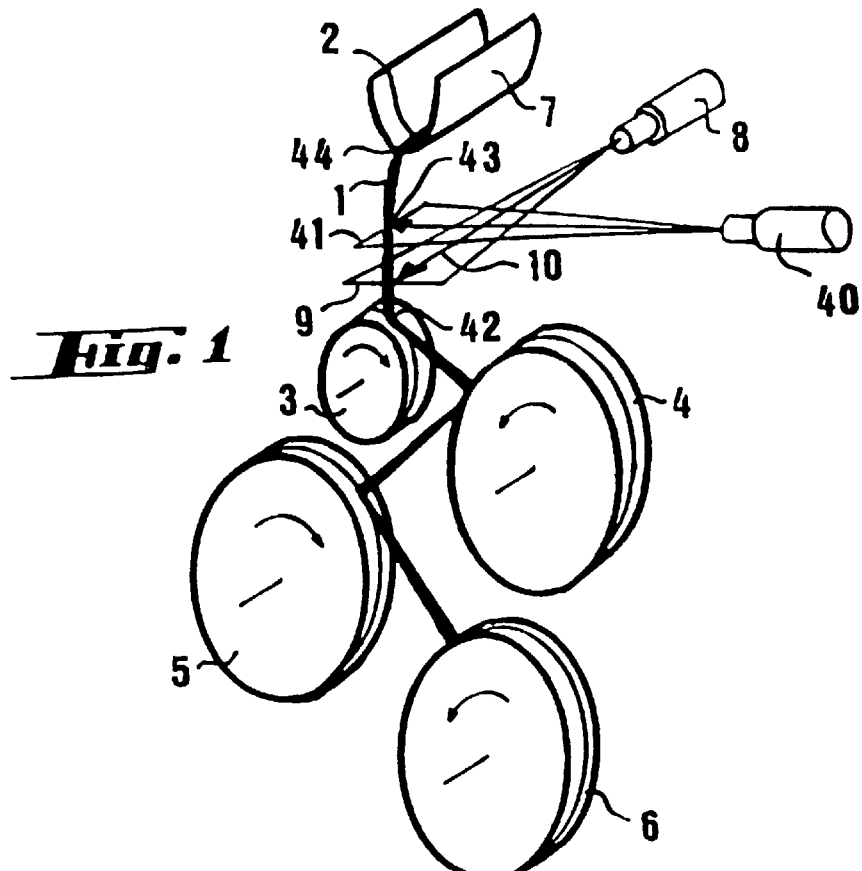
FIG. 1 shows a fiber-drawing installation according to a first embodiment of the systems of the invention.

In the device shown schematically in FIG. 1, a stream 1 of a melted mineral mass 2 such as of rock or slag is poured onto the external surface of one of a series of steel discs 3, 4, 5, 6 rotating at a velocity of the order of 2000–10000 rpm about axes which are approximately perpendicular to the direction of the stream.

Each disc 3, 4, 5, 6 has a diameter of the order of from 10 to 50 cm and a thickness of the order of from 5 to 15 cm.

The temperature of the stream 1 of the melted mass is between 1000 and 1900° C. This melted mass is poured onto the rotors 3, 4, 5, 6 at a rate of approximately 0.5 to 10 tonnes per hour. The first disc 3 is, in general, smaller than the others and is substantially used to transform the dense stream of liquid mass into a secondary, accelerated stream.

In the areas of the rotors exposed to the melted material, the temperature of the exterior surface of the rotor is maintained at less than 800° C. by a system for circulation of water therein, which is not shown.

The stream of melted material arriving on a given rotor divides into two, one part remaining adhered to the rotor and the other part being ejected. On the rotors 4, 5, 6 the adhering melted material is divided into thin drops which are drawn out in the form of fibers under the effect of centrifugal force.

In FIG. 1, the melted mineral mass 2 is transported by a chute 7 which is supplied by the outlet aperture of a melter, for example a cupola furnace, which is not shown. In one of the variants of the invention, the chute 7 is advantageously provided with means for displacement in a generally horizontal direction parallel to the axis of the rotors and in another generally horizontal direction, perpendicular to the first. These displacement means, for example electric jacks, are not shown in FIG. 1.

In place of the chute 7, there is sometimes used an intermediate storage container, called a stabilizer, such as that described in the European patent application EPA-495 723; the function of this type of container is, substantially, the regulation of the temperature and of the flow rate of the melted material 2 supplied to the stream 1. If a stabilizer is used, it is also advantageously provided, as is the chute 7, with displacement means for controlling the position of the stream of melted material 1 in relation to a fixed fiber-drawing machine.

In FIG. 1, there is shown a first camera 8 which scans a rectilinear field defining a first measuring direction 9 which permits, in the case in FIG. 1 in which the horizontal direction of movement of the stream is in the same vertical plane as the camera 8, the displacement of the stream of melted material 1 to be followed in this horizontal direction.

In the Figure, the axis of observation 10 of the camera 8 is shown parallel to the axis of the rotors. It is actually advantageous that the measuring direction and the directions of displacement of the machine are the same. However, owing to the installation of the camera 8 in a very congested environment around the fiber drawing machine, the direction of the axis 10 of the camera 8 may diverge slightly from this position: even if the axis 10 is not perpendicular to the measuring direction 9, the exact determination of the position of the stream 1 in the direction 9 can be easily deduced from the measurement provided by the camera 8.

Still with respect to FIG. 1, there is shown a second camera 40 which observes the stream 1 in a second horizontal measuring direction 41 which is approximately contained in the vertical plane containing the stream 1.

Exceptionally, it may occur, in certain installations, that the stream 1 is permanently perfectly vertical. In this case, the only principle that must be respected is to have the measuring directions 9 and 41 preferably horizontal and substantially perpendicular to one another. However, in general, the velocity of the stream has a horizontal component at the origin thereof, either because a chute 7 is being used, as in the Figure, or because, in the case of a stabilizer, it is displaced in rotation in a vertical plane, which also rotates the axis of the outlet aperture of the stream 1 in a vertical plane, in which the stream is thus located.

In this case, the camera 8 and the axis 10 thereof are located approximately in the same plane as the stream, whereas it is the measuring direction 41 of the camera 40 which is located in the said plane.

The point that is important to the operator of the machine is to know, and, if possible, to control, the point of impact 42 of the stream 1 on the first rotor 3. Using the camera 8, the knowledge of the position of the stream 1 in the measuring direction 9 is sufficient to determine the position of the point 42 in the tangential direction. However, in the other direction 41, parallel to the axis of the rotors, it is necessary—except if the measurement is in the vicinity of the point 42 itself, which is difficult—to perform a correction to deduce, from the position of the point 43 on the line 41 and the point 44 of departure of the stream from the chute, which is known, the position 42 which is sought. Determining the corrections to be applied is within the capabilities of the person skilled in the art, either using the empirical method, by varying the horizontal component of the velocity at the point 44, for example by a variation of the flow rate, or by calculation, making hypotheses on the shape of trajectory, parabolic in first approximation.

Figure 2:
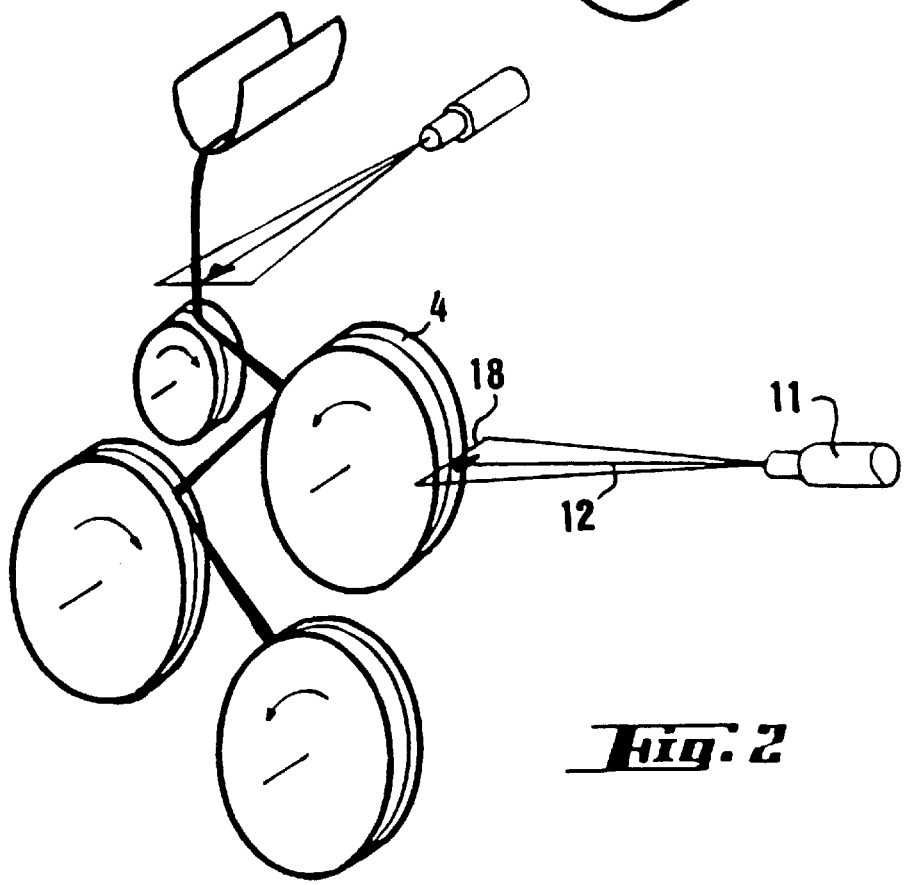
FIG. 2 shows another embodiment according to the invention.

To determine the position of the stream 1 in a direction that is parallel to the axes of the rotors, the invention provides, in its second variant, that the second camera 11, shown in FIG. 2, is installed in such a manner as to be able to observe the periphery of one of the rotors—in FIG. 2, this is the rotor 4. To this end, the camera 11, together with its observing axis 12, is located in a plane that is perpendicular to the plane of the stream, and which is, in FIG. 2, adjacent to the plane of symmetry of the rotor in question, in such a manner as not be located on the trajectory of the non-fiber particles ejected by the rotor.

The fact of not observing the stream directly has an important advantage; in effect, it avoids having to introduce corrections into the measurements.

The optical observation using a camera, such as a camera 11, is only one means among others to realize the second variant of the invention. Radiation detectors, such as those in the document EP-A-479 676, permit the same result to be obtained, in particular if the purpose is to have the melted material always on the same zone of the rotor.

It is evident that since total axial displacement of the stream 1 involves an identical displacement of successive streams which reach the rotors 3, 4, 5 and 6, it is unimportant which of them is observed.

In FIG. 3, there is shown the casing which protects each of the cameras. The camera 8 is shown, together with its lens 13 and its axis of observation 10. The casing 14 comprises a box 15, the end 16 of which is open. In the upper part of the box 15, an aperture 17 permits blast air to be introduced. This establishes a current which opposes the entry of fibers, dust, vapors, etc, and thus protects the lens of the camera 8.

This camera is, like the camera 9, of the Charged Coupled Device (CCD) type. During tests, cameras manufactured by Societe Controle Vision Industrie, provided with small Thomson rods with 1728 pixels, were used. The flow rate signal of each camera was transmitted to a microprocessor which deduced, from the signal which it received: the presence or absence of the stream; the position of the stream 1 in relation to a reference system which was fixed and was directed along measuring direction 9 in the case of the camera 8, or measuring direction 41 in the case of the camera 40, or direction 18 in the case of the camera 11.

It is the analysis—within the skill of the person skilled in the art—of the signal provided by each of the cameras 8, and 40 or 11, which allows the position of the melted material to be determined.

FIG. 4 shows a second variant of the system for controlling the position of the stream 1 in relation to the rollers of the machine. In this case, the stream 1 which issues directly from the aperture 31 of a cupola furnace 30 provided with a flow rate control system is fixed. The control of the point of impact 32 of the stream 1 on the rotor 3 can only be performed by displacing the entire fiber-drawing machine 33, by means of a rack system for example.

This displacement is advantageously performed in two orthogonal horizontal directions, parallel to the axis of the rotors in the case of the first direction 34 and perpendicular to this axis in the case of the second direction 35.

In the case in FIG. 4, the cameras 8 and 11 are advantageously mechanically connected to the fiber-drawing machine 33.

Figure 5:
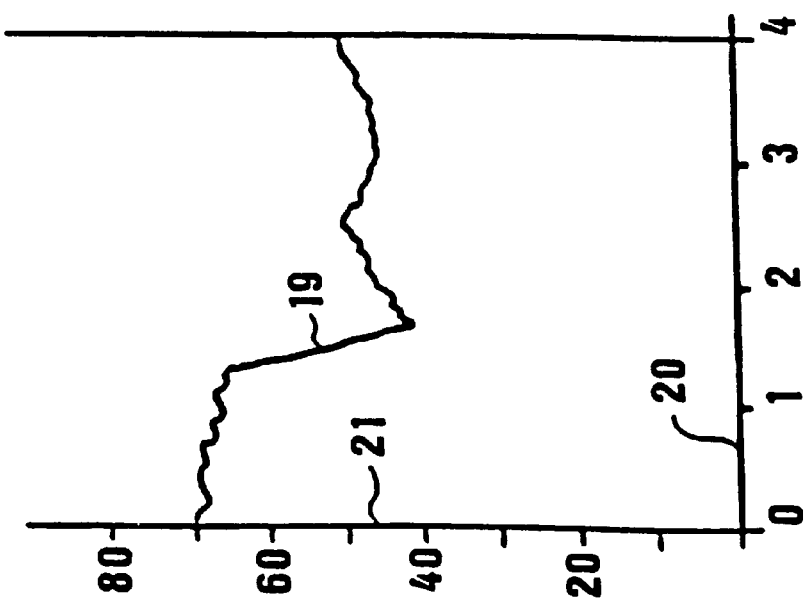

In FIG. 5, there is shown the trace 19, over time, of the position of the stream 1 registered by the axial camera 11, without this position being regulated. The abscisa 20 shows the time in quarter hours, and the ordinate 21 shows the position of the trace of the melted material, expressed in mm. it will be seen that, over one hour, the stream 1 is displaced by about twenty millimeters. Apart from a single abrupt movement, it is substantially subject to a slow drift.

Variations of this type of the axial position of the stream of melted material onto the first rotor—and, consequently, of the position of the molten material on all the rollers—have harmful effects on the fiber-drawing. When the melted material arrives at a colder zone on a rotor it adheres less to the rotor, and the fiber drawing is performed less easily, the proportion of material ejected towards the following rotor is higher, and there results a general destabilization of the operating of the machine.

Not only does the device according to the invention, in both its embodiments, permit the deviation of the stream of melted material to be followed, in particular in the direction of the axis of the rotors, but the information gathered permits this deviation to be corrected rapidly by acting on suitable means, for example in the vicinity of the chute 7 of the stabilizer. Thus, in the case of the chute 7 in FIG. 1 or FIG. 2, electric jacks, which are not shown, permit a deviation to be performed in two orthogonal directions; on the one hand in the direction of axis of the chute, i.e. approximately in the scanning directions 41 and 18 of the cameras 40 and 11 and, on the other hand, parallel to the scanning direction 9 of the camera 8. The data gathered at the end of each of the measuring series, starting at the camera 8 and the cameras 40 or 11 respectively, permits immediate action on each of the two electric jacks by a controller (not shown), and as a result, a return to the same reference point, i.e. taken as a whole, the same point of impact, of the stream 1 on the rotor 3.

The system in FIG. 4, where the relative movement between the stream 1 and the fiber-drawing machine 33 is obtained only by the displacement of this latter, obviously produces the same result.

Figure 6:
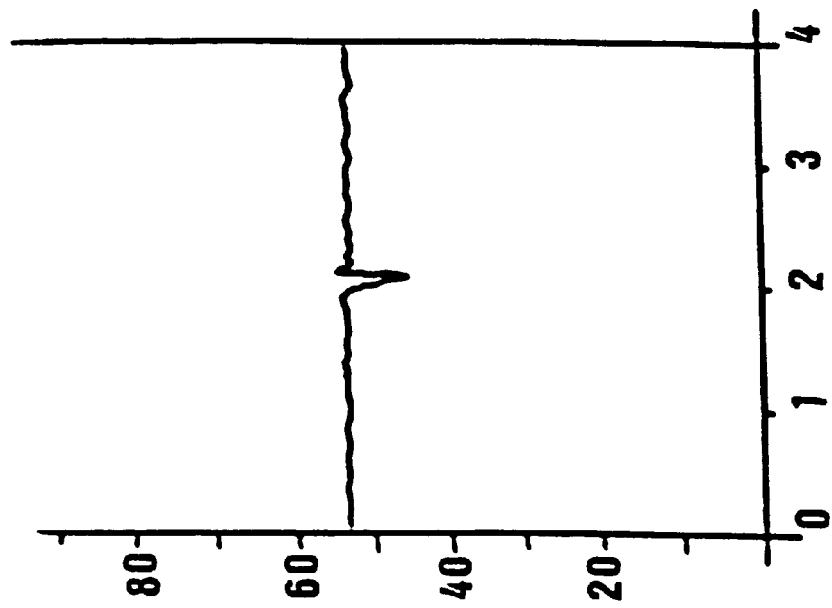
FIGS. 5 and 6 show recordings of the measurements of the position of the stream without (FIG. 5) or with (FIG. 6) the position being regulated.

In comparison with FIG. 5, FIG. 6 shows how the process according to the invention permits the stream 1 to be stabilized. In this case, the regulation operates so that if a variation in position is detected, the corresponding electric jacks are actuated to compensate for the deviation. To obtain the result shown in FIG. 6, proportional regulation processes well known to the person skilled in the art are used. The result is, as can be seen, a stability of the order of several millimeters, with the exception of the disturbance visible in the middle of the trace, which corresponds to a substantial "creep" along the length of the stream, which has caused the deviation thereof.

However, it is also possible to displace, in a controlled manner, the point at which the melted material reaches the first rotor. It is possible for example to displace, throughout the duration of the life of the rotors 3, 4, 5, 6, this point of impact progressively along a generating line in such a manner as to bring about an even wearing of the entire active surface of the rotors throughout the whole of the duration of a manufacturing period between two changes of rotors.

The process according to the invention also permits the signals from the camera 11 to be used for another purpose. In determining the width of the area under examination, i.e. the width of the zone covered by the molten material, useful information is obtained concerning the development of the process, in particular concerning the risk of the melted material escaping from the rotor, even though the point where the material is deposited is controlled, the width of the zone on which information is being obtained, the temperature and/or the viscosity, the "adhesion" of the material on the rotor and other features of fiber-drawing.

In relation to previous methods, the process according to the invention permits more reliable results to be obtained. Furthermore, as a result, the measurements can be used for controlling the fiber-drawing process, whereas without this reliability, control is not possible.

The direct measurement of the stream, even in the case where corrections are applied, presents a further disadvantage. The stream 1 is not always cylindrical and irregularities, in particular "creep", may occur, the drops escaping from the edge of the chute 7 or the aperture 31, and sliding along the stream 1. When the stream 1 is measured directly, these irregularities interfere with the measurement. If the camera 11 observes the stream 1 directly, it is impossible to avoid them. In the vicinity of the measuring zone 18 at which the camera 11 observes the rotor 4, irregularities which may exist on the stream 1 are compensated for, being "smoothed", and, in particular, "creep" does not interfere with the measurement at all. The method according to the invention provides an elegant solution to the problem posed.

Obviously, numerous modifications and variations of the present invention are possible in Light of the above teachings. It is therefore to be understood that within the scope of the appended claims, the invention may be practiced otherwise than as specifically described herein.

What is claimed as new and desired to be secured by Letters Patent of the United States is:

1. Process of obtaining mineral fibers from a thermoplastic material comprising the steps of:

melting the material, discharging the melted material in the form of a stream from a starting point to a point of impact onto a defined rotor of a centrifugal spinning machine having at least one rotor, whereby the stream of melted material arriving on one of said at least one rotors divides in two parts, one part remaining adhered to the periphery of said one rotor and the other part being ejected, such that mineral fibers are obtained;

a first step of directly determining the position of the discharged stream in relation to the rotor in a first horizontal direction which is approximately perpendicular to a vertical plane containing the stream;

a second step, occurring simultaneously with said first step, of determining the position of the said material in the melted state adhered to the periphery of a given one of the at least one rotors in a second horizontal direction substantially parallel to the vertical plane containing the stream; and a step of adjusting the position of at least one of the stream and at least the given rotor to regulate the position of the point of impact on the defined rotor in accordance with the positions determined in the first and second steps.

2. Process according to claim 1, wherein the first step of determining the position of the stream comprises an optical observation of the stream.

3. Process according to claim 1, wherein the centrifugal spinning machine comprises plural rotors, and wherein in the first and second determining steps the position is determined in relation to one of said plural rotors.

4. Process according to claim 1, wherein the step of determining the position of the material at the periphery of the rotor is performed by optical observation.

5. Process according to claim 1, wherein the optical observation is performed by a CCD camera.

6. Process according to claim 1, wherein said regulating step comprises displacing the stream relative to the fiber-drawing machine in each of said first and second directions in a controlled manner.

7. Process according to claim 1, wherein said regulating step comprises displacing the point of impact of the stream on the defined rotor on a generated line along a width of the defined rotor in the direction of the axis of rotation of the rotor.

* * * * *